United States Patent Office 3,282,138
Patented Nov. 1, 1966

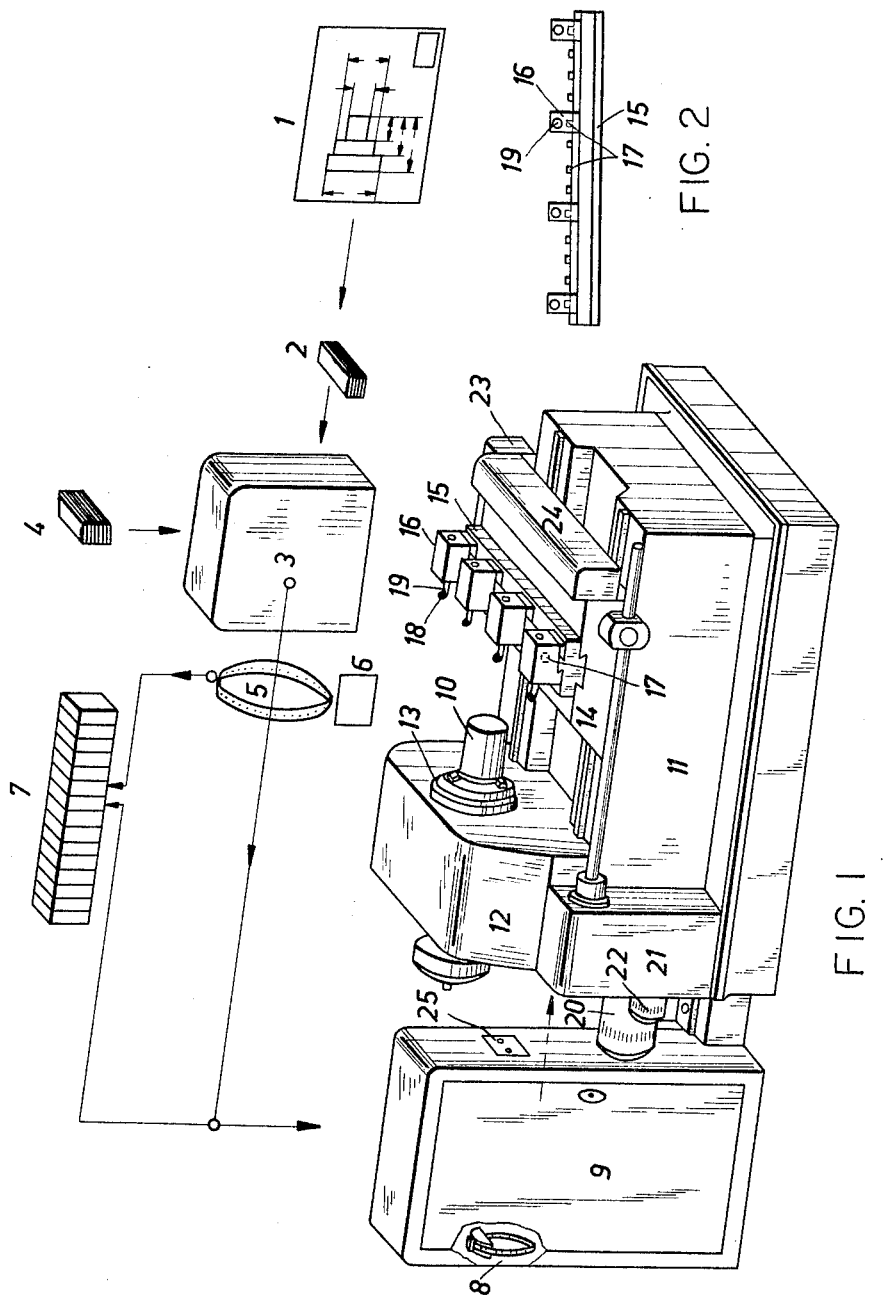

3,282,138
SHORT-BED LATHE WITH NUMERICAL
POSITIONING CONTROL
Paul Stöckmann and Erich Dozekal, Langen, Hesse, Germany, assignors to Pittler Maschinenfabrik Aktiengesellschaft, Langen, Hesse, Germany
Filed Oct. 15, 1964, Ser. No. 404,000
Claims priority, application Germany, July 8, 1964,
P 34,651
2 Claims. (Cl. 82—14)

Short-bed lathes are used for machining of parts whose diameter is in general greater than their length and therefore of workpieces which do not have to be supported by a tailstock. The tools are located on generally a plurality of longitudinal and cross slides or in turret heads which are provided with a plurality of tools, the workpieces being machined one after the other. There are a large number of these types of machines on the market which are controlled mechanically, electrically or hydraulically and operate automatically. For all of these machines, a certain setup time is necessary, which is justified financially only if thereupon correspondingly large numbers of pieces are to be machined. The setup time includes all of the work necesesary to adapt the machine and the tool to a given workpiece, for instance programming the speeds of rotation of the spindles and the feeds, as well as the adjusting of all rapid-traverse and feed paths of the tool slides. In this connection, it is immaterial whether there be concerned the setting of cams, adjusting of limit stops or replacement of jigs or formers. Furthermore, the chuck jaws necessary for the chucking of the workpiece must be inserted and all tools fastened in a given position, generally obtained from the tooling layout and set, in each case, to different values, in which connection, on the test-cutting of the first workpiece, a certain correction of the position of the tool cutting edge is necessary.

Even shorter setup times, such as constitute a prerequisite for the economical manufacture of series of very small number, were obtained by the use of numerical positioning controls. In this case, switching and path information can be programmed numerically on adjusting devices, either manually or in the form of a punched or magnetic tape. However, in addition to possible replacement of the chuck jaws, it is still necessary accurately to adjust on the machine all the tools in accordance with the tooling layout which has been taken as basis for the programming of the workpiece. This also requires a considerable amount of time.

The time required for the adjusting of the tools on the machine has been reduced by tool-holders which are preset off the machine and also by multiple tool holders. Recently, there has even been used a preadjusting device which makes it possible, off the machine, completely to equip a drum turret with all the tools necessary for the machining of a workpiece. The completely equipped turret, the tools of which have their tool cutting edges also adjusted properly, is replaced as a single unit upon resetting. By such a preadjustment of the tools in relation to the workpieces, the downtime of the valuable machines upon resetting is shortened, since the greatest part of the setting-up takes place outside the machine. The setup time itself, however, is scarcely shortened. In the case of series of very small numbers, the setup time can become longer than the actual machining time. It would therefore be desirable to create an automatic lathe in which the setting-up as a whole takes place considerably faster than by the hitherto existing methods, and in which, furthermore, the resetting of the machine is further simplified and decreased in time.

A very substantial decrease in the setup time by eliminating also the times for the adjusting of the tools has been obtained in accordance with the present invention by the short-bed lathe with numerical positioning control which is described below.

Opposite its headstock spindle, this machine is provided on a longitudinal slide with a relatively long cross slide with precisely defined points of attachment for the tool holders so that tools preadjusted to unit dimensions can be set up in very specific positions within a very short time. When replacing one workpiece for another, it is merely necessary to insert the new punched tape, while no change whatsoever need be effected on the tools.

In the new short-bed lathe, slight changes in the position of the tool are possible by means of electrical correction members, such as already known, without adjustments having to be effected on the tools themselves. In this way, the maintaining of tolerances is greatly facilitated.

In order to avoid the production of series of an uneconomically small number, it is at present customary that the requirement for a long period of time be made all at once on an automatic machine, an economical number of parts being obtained merely by combining together, for instance, the supply for an entire year. This manner of manufacture results in considerable expenses for storage. With the new machine, it is readily possible to save these storage expenses in that smaller number of parts, for instance the numbers necessary for the specific assembly in each case, are manufactured, in which connection obviously the same punched tape which has already been prepared is used.

In this way the setup time is reduced to a hitherto unknown low value so that this machine can be used also for very small series and even for individual parts much more economically than an ordinary manually operated lathe such as heretofore alone entered into consideration for such small numbers of parts.

The concept of a "group of parts" can be extended extremely far with the new machine. With one and the same tool combination, it is in this way possible to manufacture parts which are so different that at first glance no similarity can be noted. The previously known methods of manufacturing "groups of parts" are limited on the other hand to workpieces of substantially great similarity.

Incomparably shorter setup times than in the case of the hitherto known machines are also obtained upon the establishing of other tool combinations, since precise workpiece dimensions need not be considered when shifting tool holders. Very definite numbered positions established by an index pin are present on the cross-slide.

The pre-adjusted normal tool holders are also numbered so that the operator merely need, for instance, place tool holder No. 4 on index pin No. 10. The resetting times thus amount to only a few minutes so that even when changing from one group of parts to another, the setup time is so short that the production of very small numbers of parts, down even to individual parts, remains economical.

Nor is it in conflict with the character of the machine to use instead of a tool holder for each tool a swiveling tool holder for a plurality of tools, which is indexed in the form of switch information, for instance, contained in a punched tape. In this way, a larger number of tools can be placed on the cross-slide of limited length if this should be necessary in the case of complicated workpieces.

The new short-bed lathe is shown in the drawing. It shows a diagrammatic representation of the operation with a view in perspective of the machine and FIG. 2 shows, alongside it, the manner in which the tool holder is arranged on the cross-slide.

Based on the drawing 1 of the workpiece which is to be made, the programmer establishes a so-called source program and feeds it in the form of a stack of punched cards 2 to the electronic computer 3. The computer which has been previously fed the "Autopit" program 4 (Autopit=automatic programming including technology), determines all switching and path information necessary for the machining of the workpiece with due consideration of the tool combination contained in the source program and the dimensions of the raw and finished workpiece, and produces a punched tape 5. Instead of feeding a given tool combination, the computer can also determine this combination and by means of a page printer, deliver it in clear text 6 at the same time as it delivers the punched tape.

The punched tape passes directly or through a punched tape file 7 to the punched tape reader 8 of the numerical positioning control, arranged in the cabinet 9.

From the blank 10, the machine produces the finished part in accordance with the drawing 1. The machine consists of the frame 11, the head stock 12, in which the spindle with the chuck 13 rest, the longitudinal slide 14 in which the cross-slide 15 is placed which is moveable in a transverse direction. In order to fix the position of the tool holder carriers 16, the cross-slide has index pins 17. The tool holders 19 which are provided with cutting tools 18 are preadjusted to unit dimensions off the machine.

The drive of the spindle is effected from the main drive motor 20 through a gearing which makes it possible automatically to select the spindle speed which is at each moment the most favorable one. The longitudinal and cross drive of the carriage is effected by a feed gearing 21 and a motor 22 for the rapid-traverse, rapid infeed and fine infeed.

The "longitudinal" path measuring device 23 and the "transverse" path measuring device 24 report the instantaneous value of the carriage position at each moment to the numerical positioning control, in which connection the transverse positions can be slightly varied by correction members 25 in order to maintain tolerances.

We claim:

1. Short-bed lathe with numerical control including a lathe frame, a horizontally directed work spindle rotatably mounted in said frame, a longitudinal slide slidably mounted on said frame for horizontal movement in a direction parallel to the axis of the work spindle, a relatively long cross slide mounted on the said longitudinal slide for horizontal movement with respect thereto in a direction transverse to the axis of said work spindle, a plurality of individual tool holders capable of being preset off the machine in dependence on the workpiece to be produced, fastening means for securing the tool holders on the said cross slide at specific points for positioning the said tool holders in longitudinally spaced relationship to each other independently of the exact dimensions of the workpiece, information storage means, and numerical control means for controlling said slides as a function of the information of said information storage means in any desired sequence, with any desired speed and over any desired path, to the positions necessary for machining.

2. A lathe as claimed in claim 1 in which said positioning means comprise index pins.

References Cited by the Examiner

UNITED STATES PATENTS 2,901,927  9/1959  Morgan _____ 77—4
3,156,144  11/1964  Weaver _____ 82—14

WILLIAM W. DYER, Jr., *Primary Examiner.*

G. A. DOST, *Assistant Examiner.*